United States Patent
Levitov

[15] 3,683,855
[45] Aug. 15, 1972

[54] AQUARIUM SOLUTIONS FOR SUPPORT OF BOTH FRESH WATER AND SALT WATER FISH

[72] Inventor: Leo Levitov, Jersey City, N.J.
[73] Assignee: Tronic Products, Inc., Jersey City, N.J.
[22] Filed: Jan. 18, 1971
[21] Appl. No.: 107,260

[52] U.S. Cl. .................119/5, 424/339, 210/59, 119/3, 99/1
[51] Int. Cl. .................A01k 61/00, C02b 1/18
[58] Field of Search ..........119/2, 3, 5; 210/59; 99/1; 424/339

[56] References Cited

UNITED STATES PATENTS

| | | |
|---|---|---|
| 3,110,285 | 11/1963 | Greenough....................119/3 |
| 3,406,662 | 10/1968 | Vik et al.........................119/3 |
| 3,446,733 | 5/1969 | Shell..............................210/59 |
| 3,522,793 | 8/1970 | Proewig.........................119/3 |

*Primary Examiner*—Aldrich F. Medbery
*Attorney*—Gloria K. Koenig

[57] ABSTRACT

Undissociated, non-toxic, organic compounds and inorganic silicate compounds which are polymerized in the presence of acid phosphate salts added to the solutions having from one-third to two-fifths of ocean salt concentrations maintain the osmotic pressure of the solutions at the equivalent of the osmotic pressure of natural ocean water and provide media for aquariums which will support both fresh water and salt water fish.

19 Claims, 1 Drawing Figure

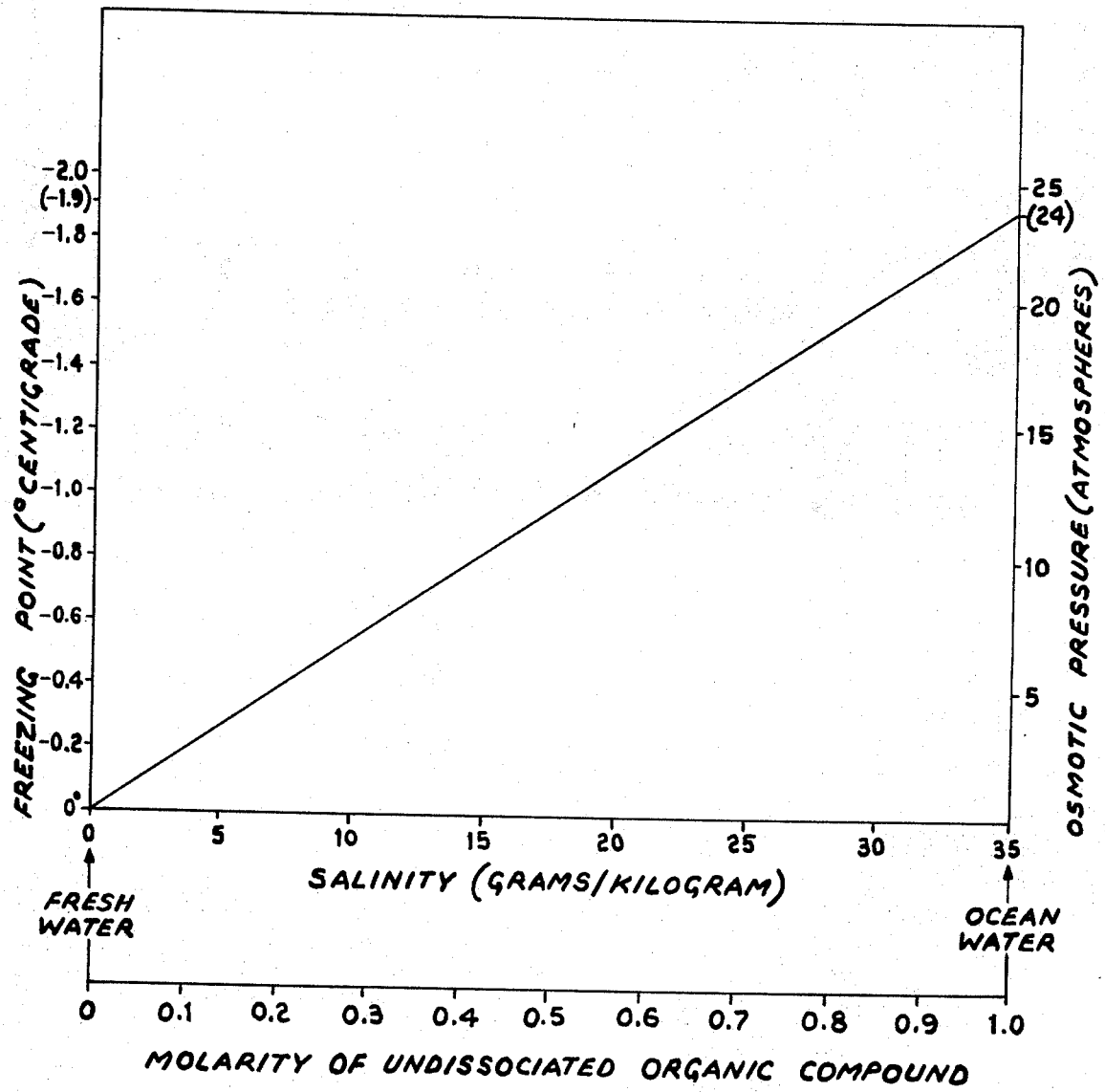

AQUARIUM SOLUTIONS FOR SUPPORT OF BOTH FRESH WATER AND SALT WATER FISH

BACKGROUND OF THE INVENTION

1. Field of the Invention

This invention relates to the preparation and composition of aquarium solutions which can support certain types of both salt and fresh water fish. The salinity of the solution is adjusted to approximately one-third to two-fifths of the composition of ocean salt and the osmotic pressure of the solution is maintained at the osmotic pressure of ocean water by the addition of either undissociated, non-toxic organic compounds or silicate compounds which are polymerized in the presence of acid phosphate salts.

2. Description of the Prior Art

The internal fluids of both fresh and salt water fish have approximately the same salinity despite the difference of salt concentrations of the water in which they live. The salinity of the internal body fluids of salt water fish is approximately two-fifths that of ocean water; the salinity of the internal fluids of fresh water fish is approximately one-third that of sea water. Under the principles of osmotic pressure it would appear that the salinity of the body fluids of fresh water fish should be reduced by the transfer of water from the surrounding media into the body of the fish and that the salinity of the body fluids of salt water fish should be increased by the transfer of water from the body of the fish to the surrounding media. However, the gills and kidneys of the two types of fish are developed to accommodate to the different compositions of the water in which each type lives. Thus, the kidneys of fresh water fish are developed to retain the body salt while excreting most of the water taken in through the gills and the gills are not developed to remove salt from the surrounding water. On the other hand, the gills of salt water fish are adapted to remove much of the salt coming into the body with the kidneys having little or no function.

A solution having between one-third and two-fifths of the salt concentration of ocean water is within the compatible of the salt concentration of ocean water is within the compatible range for support of both fresh and salt water fish in the same tank. Normal ocean water at 20° C and a specific gravity of 1.025 has a salinity of 35. Salinity is defined as the number of grams of salt in 1,000 grams of water. A salinity of 35 means that there are 35 grams of salt per kilogram of water, which is equivalent to a solution containing 3.5 percent salt. Expressed another way, there are approximately 36 grams of salt per liter of water in natural ocean water.

Some previous work has been attempted to produce a solution which would permit both fresh and salt water fish to survive in the same aquarium, by making an iso-osmotic aquarium, that is, an aquarium which has a salinity approximately equal to the salinity of the internal fluids of fish. The salt concentration of such aquariums has been made to equal between one-third and two-fifths of the salinity of sea water. This is equivalent to a salinity of between 12 and 14, with an average salinity of 13. Fresh and salt water fish have been kept alive in solutions having the aforesaid salinity but the range is narrow and critical.

SUMMARY OF THE INVENTION

It is an object of this invention to provide solutions in which many types of both fresh and salt water fish can survive. An aquarium containing both fresh and salt water fish is of great interest to hobbyists. In addition, an aquarium containing a salt water solution of lower salinity than ocean water does not require the expensive special glass and plastic equipment now required to prevent corrosion in tanks used for full ocean water concentrations.

It is another object of this invention to expand the critical range of salinity of solutions in which certain types of both fresh and salt water fish can survive beyond the salinity of an iso-osmotic ocean, which has an average salinity of 13, by substituting non-toxic, undissociated organic compounds or polymerized silicates for some of the salts in normal ocean water.

Another object of this invention is to provide a media which is beneficial to the health of both fresh and salt water fish by varying the ecology of the environment of the fish, thereby killing germs and parasites in and on the fish, which germs and parasites are not as well adaptable to vast changes in the environment as are the fish and will be killed when the fish are placed in the modified environment.

Another object of this invention is to provide a method of treating sick fish. Some of the organic compounds which are added to the diluted ocean water solution, as will be described below, are known to have bactericidal and parasiticidal properties. The placing of fresh water fish into a solution of increased salinity and the placing of salt water fish into a solution of reduced salinity from their respective natural environments, which solutions contain organic compounds having bactericidal and parasiticidal properties, provides the double treatment for germs and parasites by varying the ecology and subjecting the germs and parasites to bactericides and parasiticides.

These and various other objects and advantages of this invention will be more fully apparent from a detailed consideration of the following description and the appended claims.

This invention comprises the composition and method of preparing of aquarium solutions having a salt concentration of one-third to two-fifths of ocean water which are added (1) approximately a half mole of a non-toxic, undissociated organic compound, or (2) between 0.75 and 1.5 grams per liter of silicon dioxide polymerized in solution by the addition of sodium or potassium acid phosphate salts, to maintain the osmotic pressure of the solution at the equivalent of natural ocean water.

There is a direct correlation between osmotic pressure expressed in atmospheres, freezing point of the solution and salinity of the solution, as shown in the accompanying graph. It is therefore possible to estimate the osmotic pressure of a solution by measuring the freezing point of the solution. Normal ocean water having a salinity of 35 has an osmotic pressure of 24 atmospheres and a freezing point of −1.9° C. One mole of an undissociated organic compound dissolved in 1 liter of water also has a freezing point of −1.9° C. The osmotic pressure of natural ocean water is therefore equivalent to the osmotic pressure of one mole (1 gram molecular weight) of an undissociated organic compound in one liter of water. As shown on the accompanying diagram, water with a salinity of 13 has a freezing point of approximately −0.7° C and an osmotic pressure of approximately 9 atmospheres. Water with a salinity of 13, or containing two-fifths of the salt of natural ocean water, to which has been added three-fifths of a mole of an undissociated organic compound has the same freezing point and osmotic pressure as normal sea water. In many cases, it is not necessary for the survival of both salt and fresh water fish in the same aquarium to add the full molar concentration of the undissociated organic compound to the diluted ocean water to bring the osmotic pressure and freezing point to the osmotic pressure and freezing point of natural ocean water. In general, the addition of approximately one-half mole of an undissociated organic compound to a solution having between one-third and two-fifths of the salinity of natural ocean water produces a solution having an osmotic pressure somewhat below natural ocean water, i.e., between 18 and 22 atmospheres and a freezing point somewhat above natural ocean water, i.e., between −1.6° C. and −1.8° C., but is effective for the support of both fresh and salt water fish.

Alternatively, the osmotic pressure of aquarium solutions having salt concentrations of one-third to two-fifths of ocean water may be maintained at the osmotic pressure of natural ocean water by the addition of a silicate salt, preferably potassium silicate, and thereafter adding sodium or potassium acid phosphate to polymerize the dissolved silicate. The presence of the silicate ion also increases the ionization of the other salts in the diluted ocean water, which increases the osmotic pressure of the solution. Further, the presence of the silicate ion changes the colligative properties of the solution. It has been found that dissolving potassium silicate in a diluted ocean solution to yield a concentration of between 0.75 and 1.5 grams of silicon dioxide per liter of diluted ocean solution and thereafter treating the solution with sodium or potassium acid phosphate salts, as will be described below, produces a solution which is effective for the support of both fresh and salt water fish.

The term "ocean water" as used herein is intended to include either natural or simulated ocean water. A diluted "ocean" can be prepared by either diluting natural ocean water with fresh water or by adding salts to fresh water. As noted above, natural ocean water contains 3.5 percent salt, of which 65 percent or 24 grams per liter is sodium chloride, the remaining 35 percent consisting of magnesium sulfate, magnesium chloride, potassium chloride, calcium carbonate and many trace elements. An example of a simulated ocean having a salinity between one-third and two-fifths of natural ocean, i.e., between 12 and 14, is one which contains per liter: 13 grams sodium chloride, 0.25 gram magnesium sulfate, 0.22 gram magnesium chloride, 0.07 gram calcium chloride, 0.05 gram potassium chloride, 0.05 gram sodium bicarbonate, 0.05 gram trace elements. The aforesaid formula can be varied provided that the total salts are maintained at approximately 13 grams per liter and the degree of dissociation is maintained. Sodium chloride, being the most readily dissociated salt of the group, lends itself to be the easiest variable of the group but many variations in the concentrations of the respective salts are possible.

There are many organic compounds which are undissociated in water, which will produce the desired effect on the osmotic pressure but some have disadvantages in that they are toxic, odorous, too expensive, require too much of the compound to be dissolved per liter or produce other undesirable effects. Thus, a half mole of cane sugar, which has a gram molecular weight of 0.342, dissolved in a liter of salt solution having from one-third to two-fifths of the salt concentration of ocean water, will bring the osmotic pressure of the solution to approximately the equivalent of ocean water and form a solution in which both salt and fresh water fish will survive, but the method is expensive because it requires a considerable amount of sugar, i.e., 171 grams per liter, to produce a concentration of one-half mole per liter and the resulting solution encourages the growth of molds and bacteria. Certain other types of organic compounds will produce the desired effect on the osmotic pressure but are undesirable for various reasons: many amines are toxic and odorous; certain monohydric alcohols, such as methyl and ethyl alcohol are toxic to fish.

The most desirable undissociated, non-toxic, organic compounds which will dissolve in the diluted saline solutions are the dyhydric alcohols, such as ethylene glycol and propylene glycol and the polyhydric alcohols, such as glycerol (glycerine). Ethylene glycol has a gram molecular weight of 62, the lowest gram molecular weight of the aforementioned named compounds. Thirty-one grams of ethylene glycol per liter of saline solution having a salt concentration of between one-third and two-fifths of natural ocean water will produce a solution having approximately the same osmotic pressure as natural ocean water. Ethylene glycol is the least expensive of the named compounds. It is known to be toxic to humans, but is not toxic to all fish. It has bactericidal and parasiticidal properties.

Propylene glycol, having a gram molecular weight of 76, is non-toxic to humans and fish and is priced between ethylene glycol and glycerine. An aquarium solution prepared according to the aforesaid method would require approximately 38 grams of propylene glycol per liter of saline solution, having a salt concentration of between one-third and two-fifths of natural ocean water. Propylene glycol also has bactericidal and parasiticidal properties.

Glycerol has a molecular weight of 92, is non-toxic to both humans and fish and is the most expensive of the named compounds. An aquarium solution prepared according to the aforesaid method would require 46 grams of glycerol per liter of saline solution having a salt concentration of between one-third and two-fifths of natural ocean water. Other solutions may be prepared by combining mixtures of the aforesaid organic compounds to diluted ocean water, such as one-quarter mole ethylene glycol and one-quarter mole glycerine per liter of diluted ocean water having a salinity of about 13.

The osmotic pressure of a dilute ocean solution can also be maintained at the osmotic pressure of natural ocean water by the reaction of silicon dioxide in solution with acid phosphate salts to polymerize the silicate ions in solution. Sodium silicate and potassium silicate are commercially available non-toxic, soluble, metal silicate salts which may be used in the solution. In general, sodium silicate may be used but it is less soluble than potassium silicate in the presence of the sodium ion from the sodium chloride in the diluted ocean solution. The concentrations given here after are in terms of the weights of silicon dioxide per liter because of the variation in the compositions of commercially available products.

Potassium silicate ($K_2O \cdot SiO_2$) to yield between 0.75 gram and 1.5 grams of silicon dioxide per liter is dissolved in a salt solution having from one-third to two-fifths of the salt concentration of normal ocean. A higher concentration of silicon dioxide may be used but it is not necessary for an efficient solution. Where a simulated dilute ocean is used, as set out above, the potassium chloride is omitted from the formulation in order to aid in the dissolution of the potassium silicate. The diluted ocean solution containing the potassium silicate salt is permitted to stand for at least 24 hours to assure thorough dissolution of the potassium silicate, after which time the solution has a pH of between 8.2 and 8.4. Sodium acid phosphate ($NaH_2PO_4$) or potassium acid phosphate ($KH_2PO_4$) solution is then added to adjust the pH of the solution to approximately 7.6. Between 0.0075 and 0.0125 gram per liter of either sodium or potassium acid phosphate is sufficient to adjust the pH of a liter of the aforesaid silicate solution. The polymerization of the silicates commences after the adjustment of the pH of the solution. The solution is allowed to stand or age from 3 to 7 days to permit development of the polymers in solution which cause the resulting changes in osmotic pressure. After the 3 to 7 day aging period the solution can be used as an aquarium media for both fresh and salt water fish.

A solution prepared according to the above method, having 0.75 gram of silicon dioxide per liter from potassium silicate has been found to be excellent for the support of sea horses and other salt water fish with fresh water fish.

It will thus be seen that I have provided a new and improved aquarium solution for the support of both fresh and salt water fish. Modifications may of course be made in the described compositions of my invention without departing from the invention as set forth in the accompanying claims.

I claim:

1. A method for preparing an aquarium solution which will support both fresh and salt water fish comprising adding an undissociated, water soluble, organic compound which is non-toxic to fish to a mixture of fresh and ocean water having a salinity between one-third and two-fifths of ocean water.

2. A method for preparing an aquarium solution which will support both fresh and salt water fish comprising adding about one-half mole of an undissociated, water soluble, organic compound which is non-toxic to fish to a mixture of fresh and ocean water having a salinity of between 12 and 14 grams of salt per kilogram of water to form one liter of solution.

3. The method of claim 2 wherein the organic compound comprises a dihydric alcohol.

4. The method of claim 2 wherein the organic compound comprises a polyhydric alcohol.

5. The method of claim 3 wherein the dihydric alcohol is ethylene glycol.

6. The method of claim 3 wherein the dihydric alcohol is propylene glycol.

7. The method of claim 4 wherein the polyhydric alcohol is glycerol.

8. A method for preparing an aquarium solution which will support both fresh and salt water fish comprising adding a mixture of undissociated, water soluble, organic compounds which are non-toxic to fish to a mixture of fresh and ocean water having a salinity between 12 and 14 grams of salt per kilogram of water.

9. An aquarium solution which will support both fresh and salt water fish comprising (a) a mixture of fresh and ocean water having a salinity of between 12 and 14 grams of salt per kilogram of water and (b) an undissociated, water-soluble, organic compound which is non-toxic to fish.

10. An aquarium solution which will support both fresh and salt water fish comprising (a) a mixture of fresh and ocean water having a salinity of between 12 and 14 grams of salt per kilogram of water and (b) an undissociated, water-soluble, organic compound which is non-toxic to fish in a concentration of about one-half mole per liter.

11. An aquarium solution as set out in claim 10 wherein the organic compound comprises a dihydric alcohol.

12. An aquarium solution as set out in claim 10 wherein the organic compound comprises a polyhydric alcohol.

13. An aquarium solution as set out in claim 11 wherein the dihydric alcohol is ethylene glycol.

14. An aquarium solution as set out in claim 11 wherein the dihydric alcohol is propylene glycol.

15. An aquarium solution as set out in claim 12 wherein the polyhydric alcohol is glycerol.

16. An aquarium solution which will support both fresh and salt water fish comprising (a) a mixture of fresh and ocean water having a salinity of between 12 and 14 grams of salt per kilogram of water and (b) a mixture of undissociated, water-soluble, organic compounds which are non-toxic to fish.

17. A method for preparing an aquarium solution which will support both fresh and salt water fish comprising adding a non-toxic, water-soluble, metal silicate salt, wherein the metal is selected from the group consisting of sodium and potassium, to a mixture of fresh and ocean water having a salinity of between 12 and 14 grams of salt per kilogram of water, adding a metal acid phosphate salt, wherein the metal is selected from the group consisting of sodium and potassium, to adjust the pH of the solution to approximately 7.6 and aging the solution between between 3 and 7 days.

18. The method of claim 17 wherein the amount of metal silicate salt added will result in a concentration of between 0.75 and 1.5 grams of silicon dioxide per liter of aquarium solution.

19. An aquarium solution which will support both fresh and salt water fish comprising (a) a mixture of fresh and ocean water having a salinity of between 12 and 14 grams of salt per kilogram of water; (b) a metal silicate salt wherein the metal is selected from the group consisting of sodium and potassium in a concentration of 0.75 to 1.5 grams of silicon dioxide per liter; and (c) a metal acid phosphate salt wherein the metal is selected from the group consisting of sodium and potassium in a concentration sufficient to reduce the pH of the solution to approximately 7.6.

* * * * *